July 24, 1956  E. G. ARELT  2,755,531
APPARATUS FOR FETTLING ARTICLES OF GREEN POTTERY WARE
Original Filed June 20, 1950  17 Sheets-Sheet 1
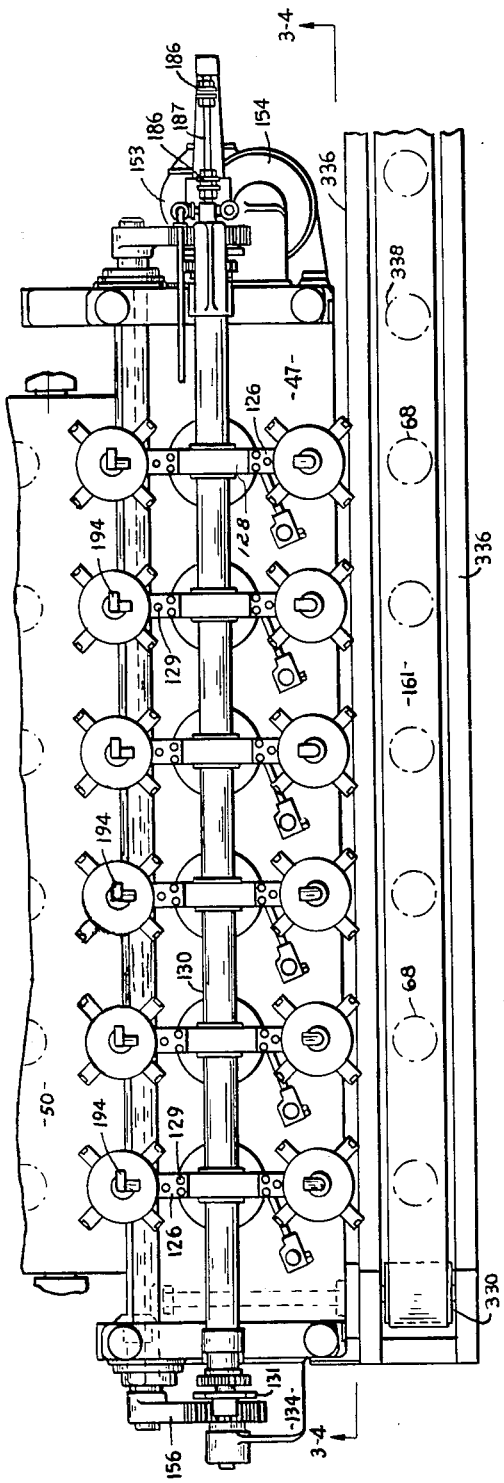
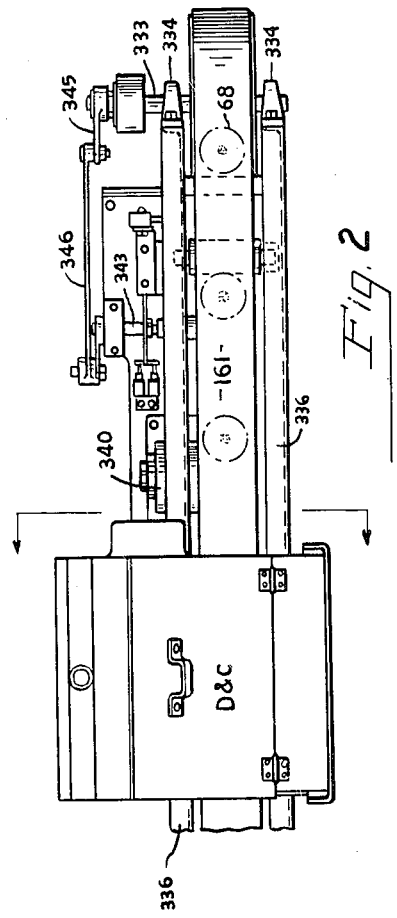
EUGENE. G. ARELT.
INVENTOR.
BY Bodell & Thompson
ATTORNEYS

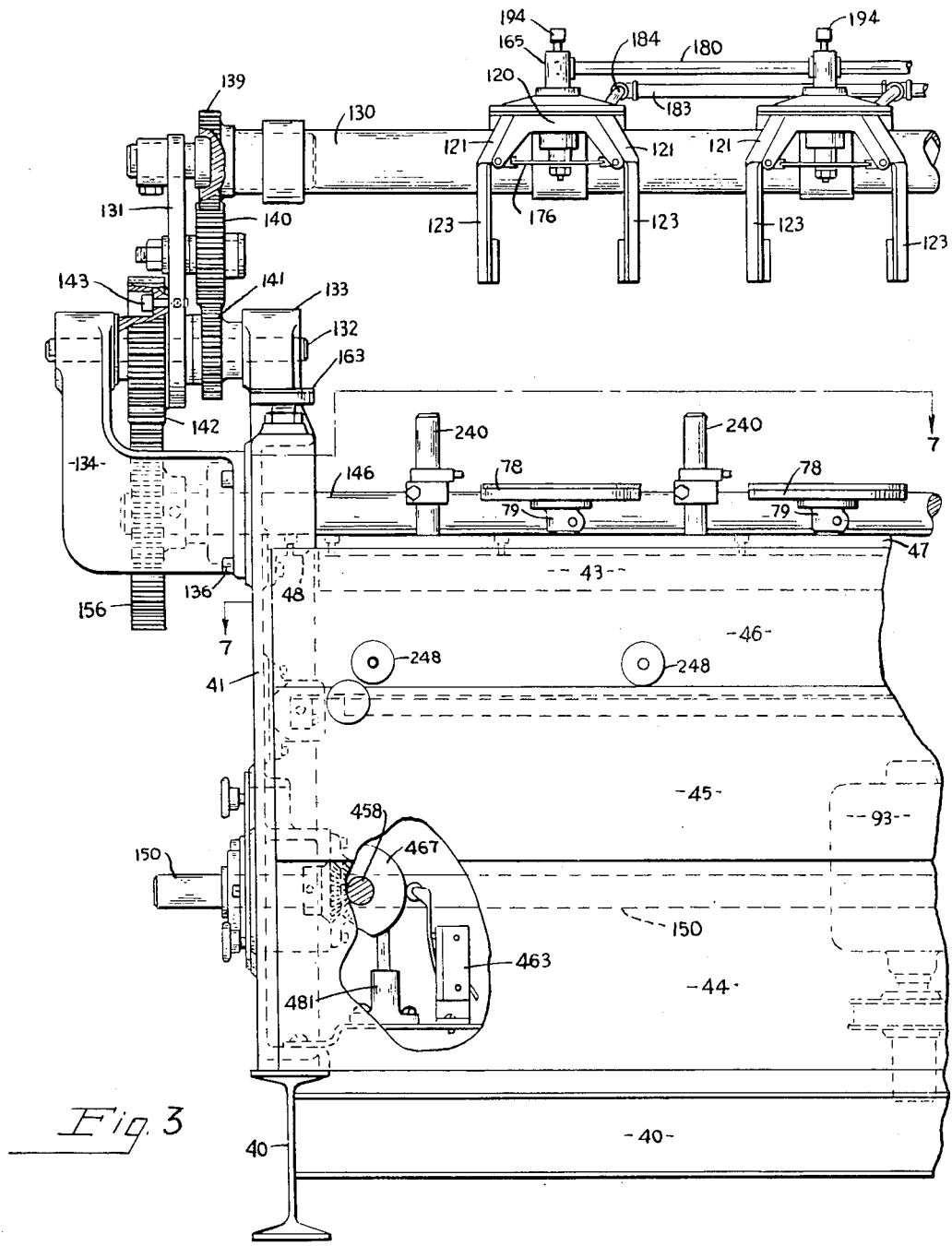

July 24, 1956 E. G. ARELT 2,755,531
APPARATUS FOR FETTLING ARTICLES OF GREEN POTTERY WARE
Original Filed June 20, 1950 17 Sheets-Sheet 3

EUGENE. G. ARELT.
INVENTOR.

BY Bodell + Thompson
ATTORNEYS

EUGENE G. ARELT.
INVENTOR.

July 24, 1956  E. G. ARELT  2,755,531
APPARATUS FOR FETTLING ARTICLES OF GREEN POTTERY WARE
Original Filed June 20, 1950  17 Sheets-Sheet 6
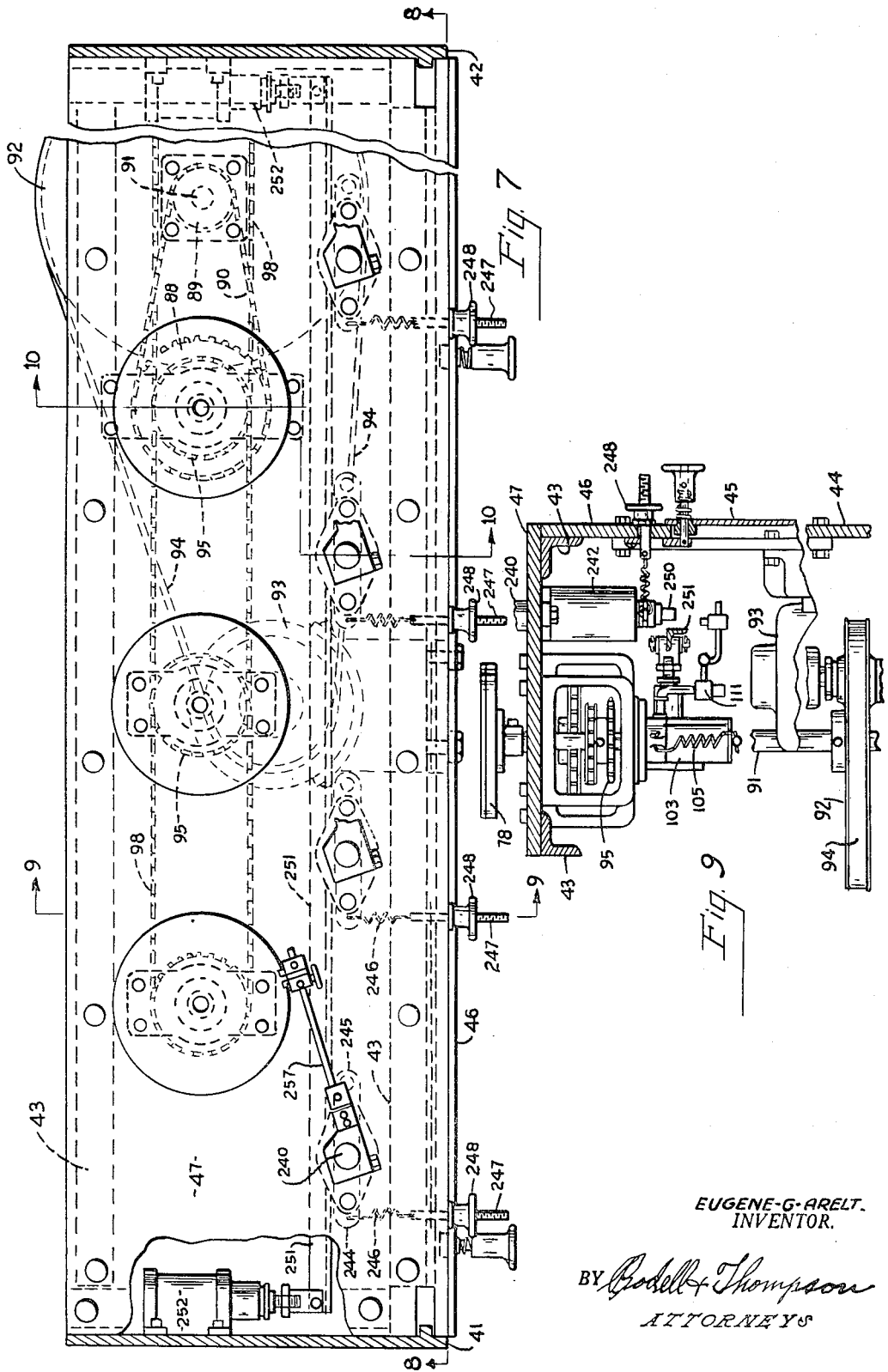
EUGENE·G·ARELT.
INVENTOR.
BY Bodell & Thompson
ATTORNEYS

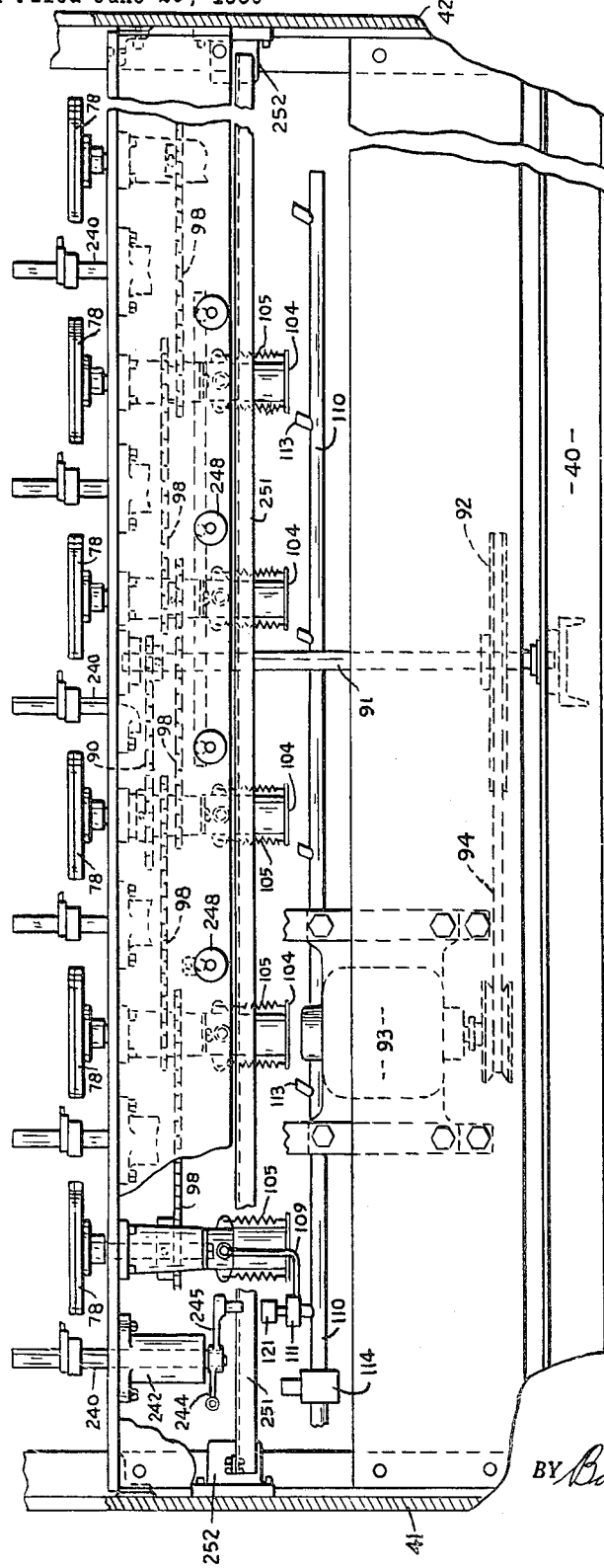

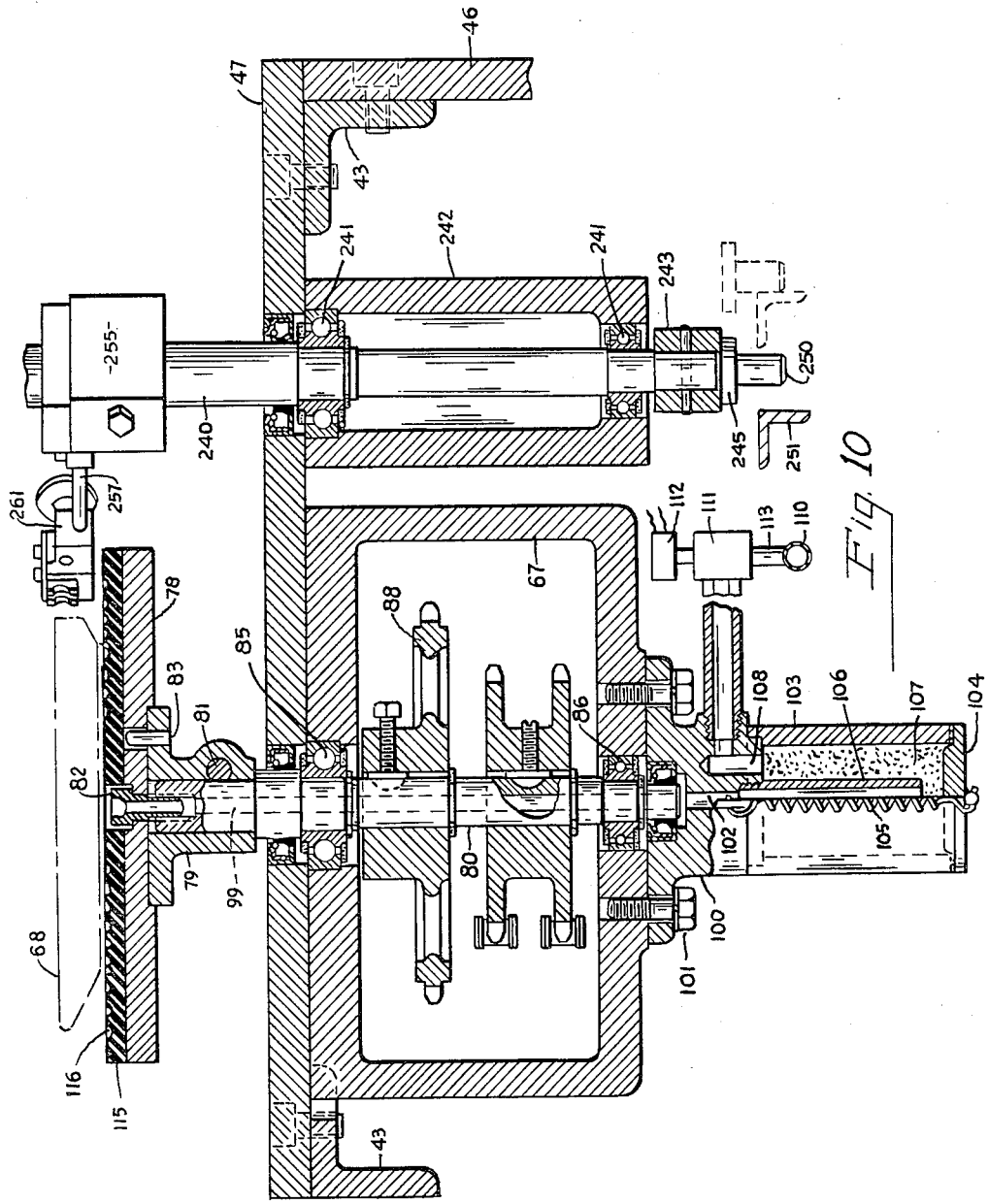

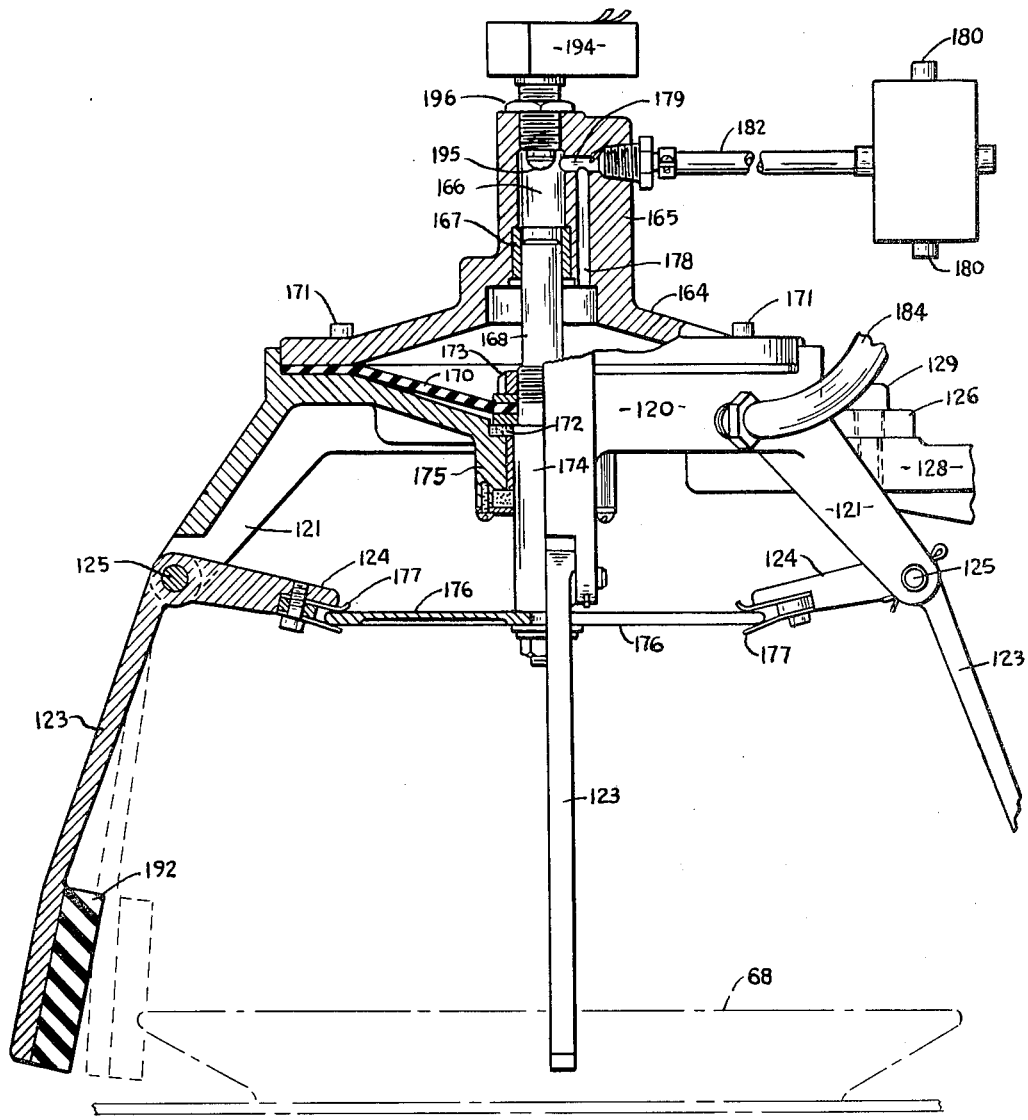

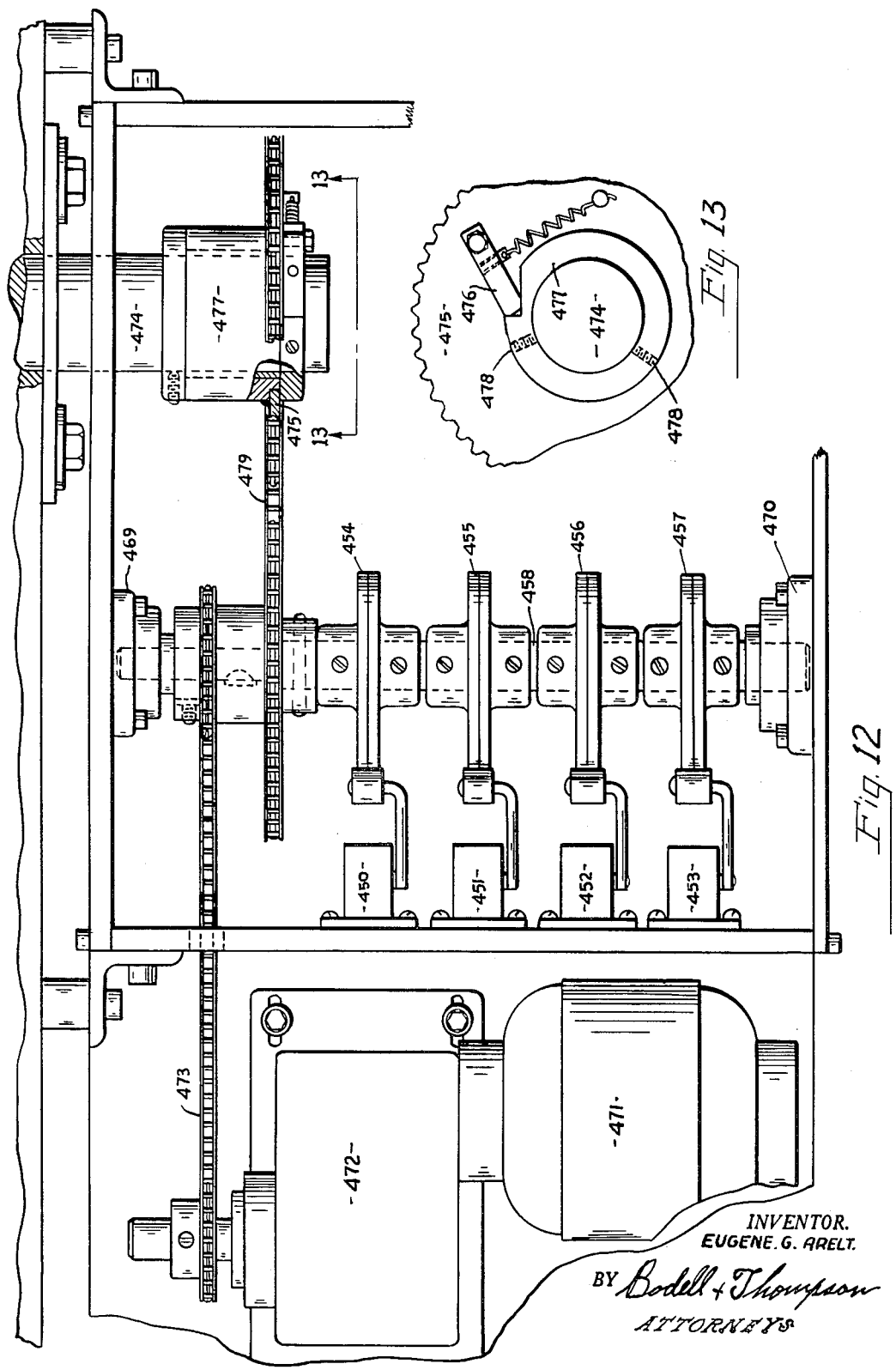

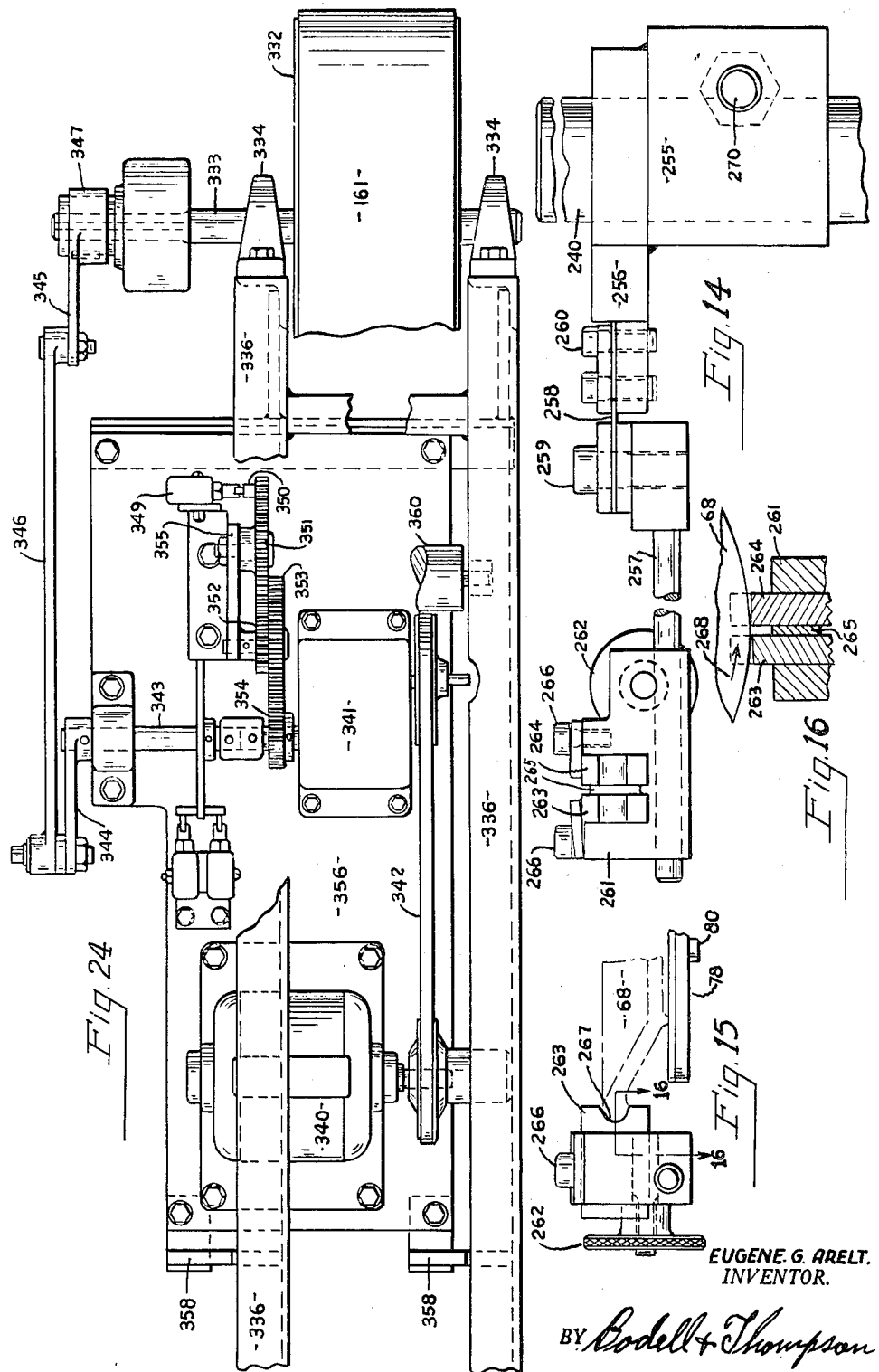

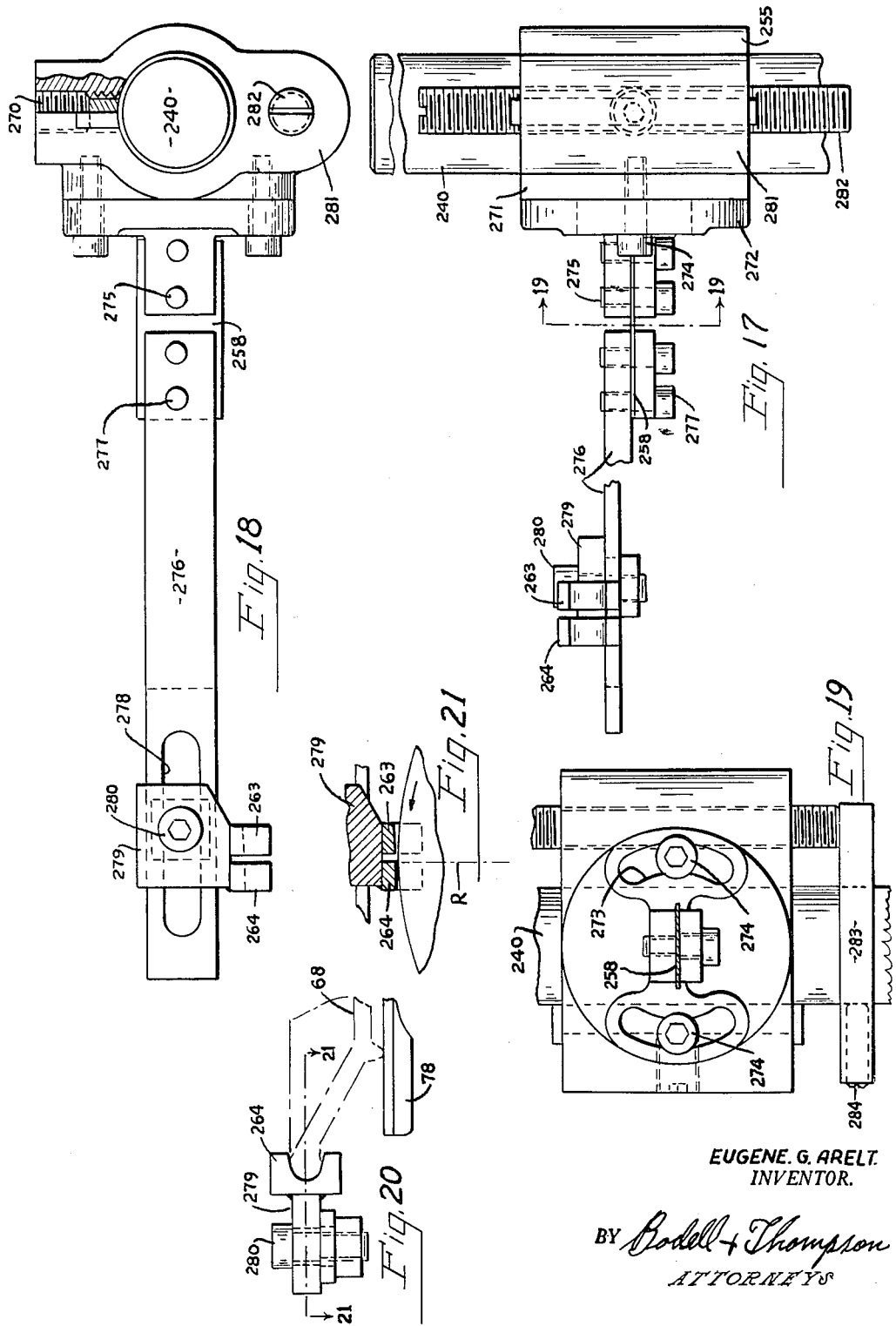

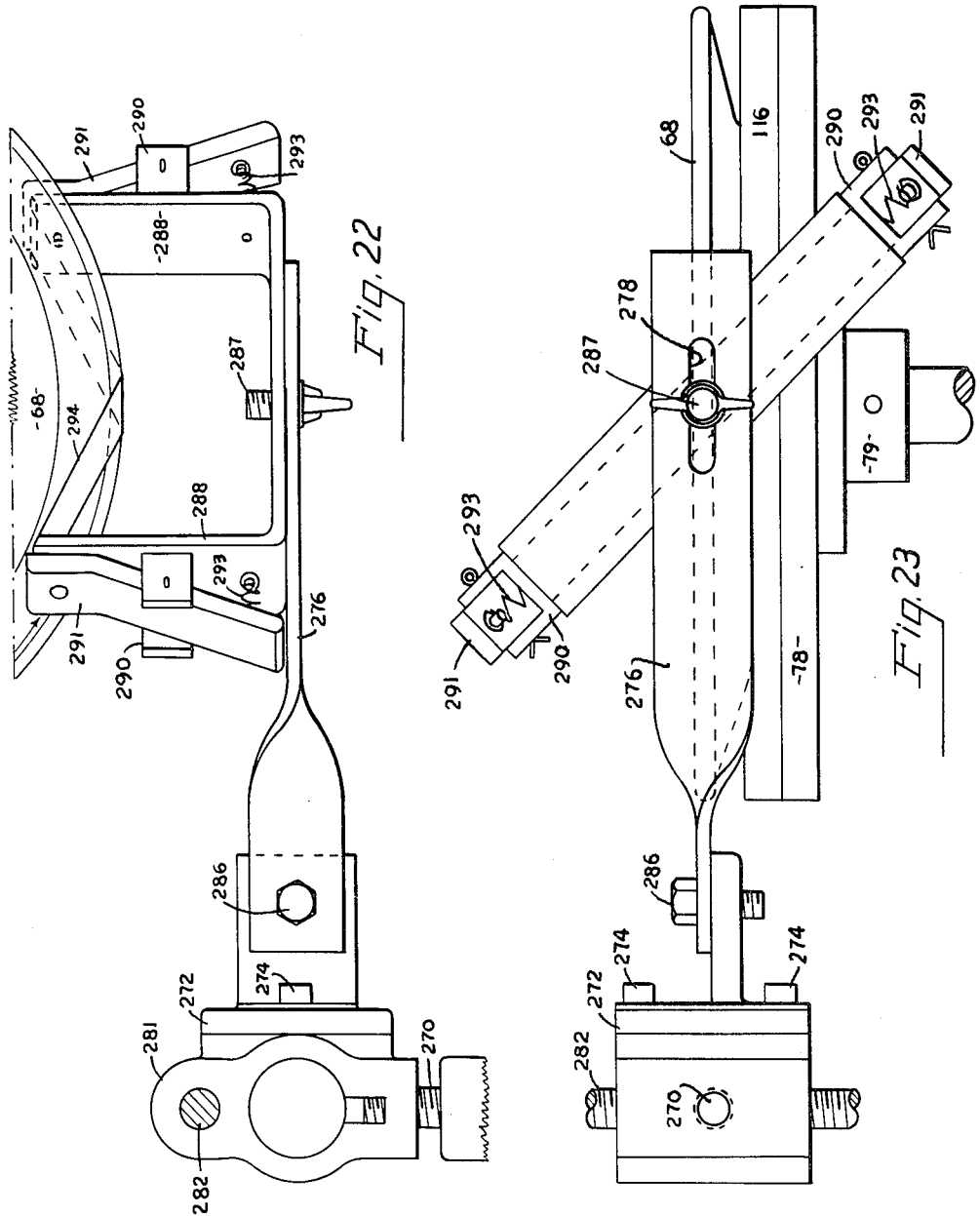

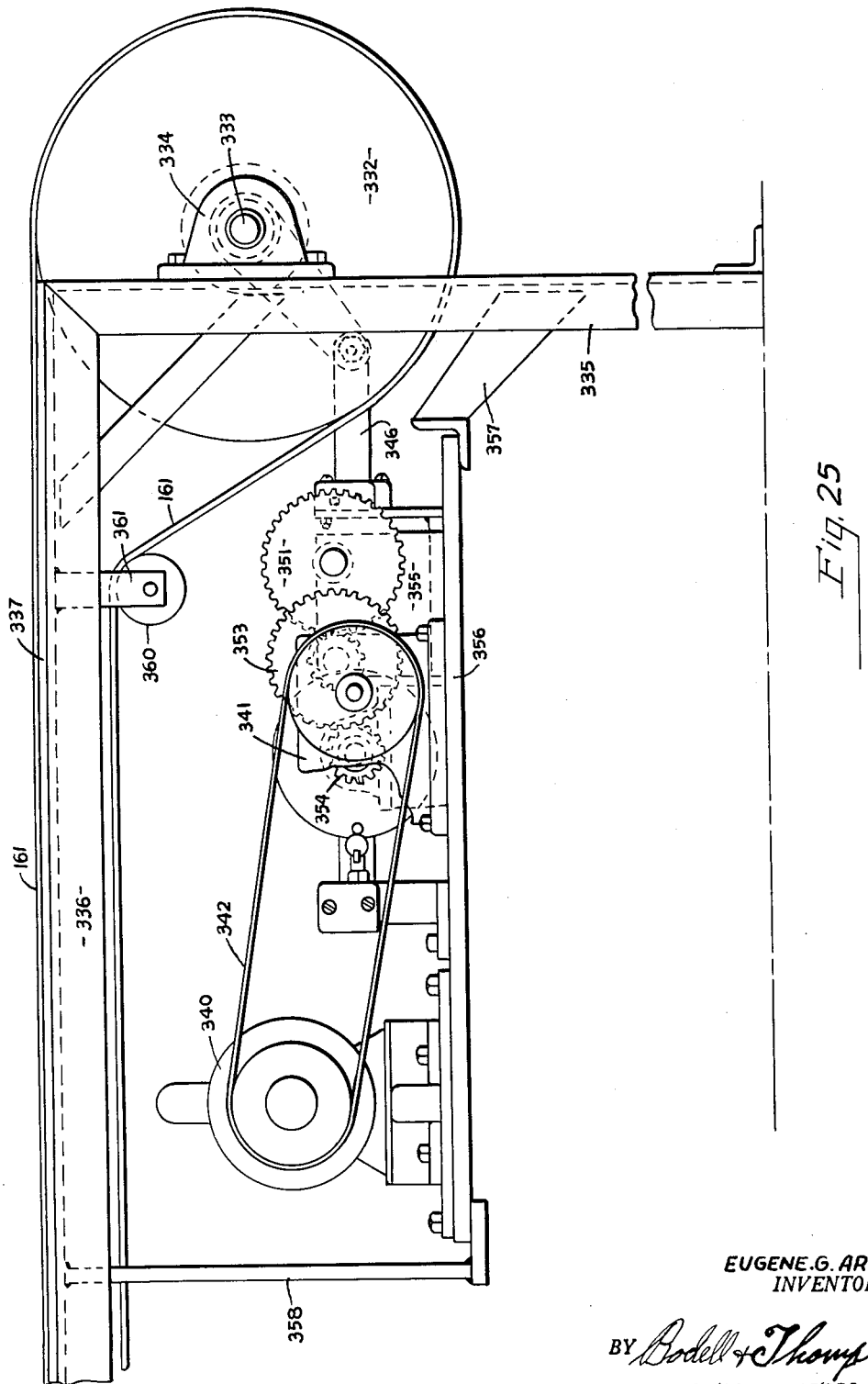

July 24, 1956 E. G. ARELT 2,755,531
APPARATUS FOR FETTLING ARTICLES OF GREEN POTTERY WARE
Original Filed June 20, 1950 17 Sheets-Sheet 15
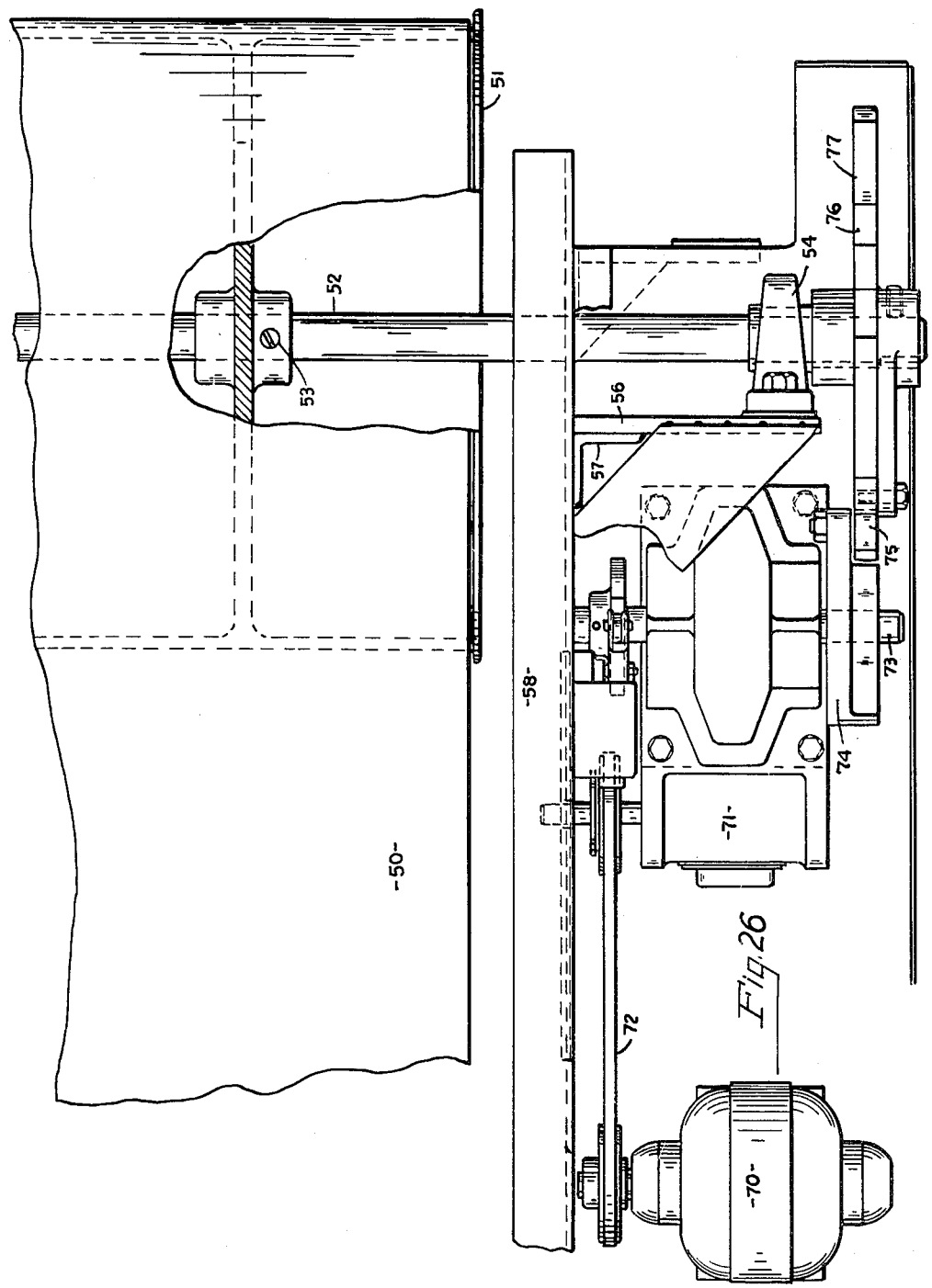
EUGENE. G. ARELT, - INVENTOR.
BY Bodell + Thompson
ATTORNEYS

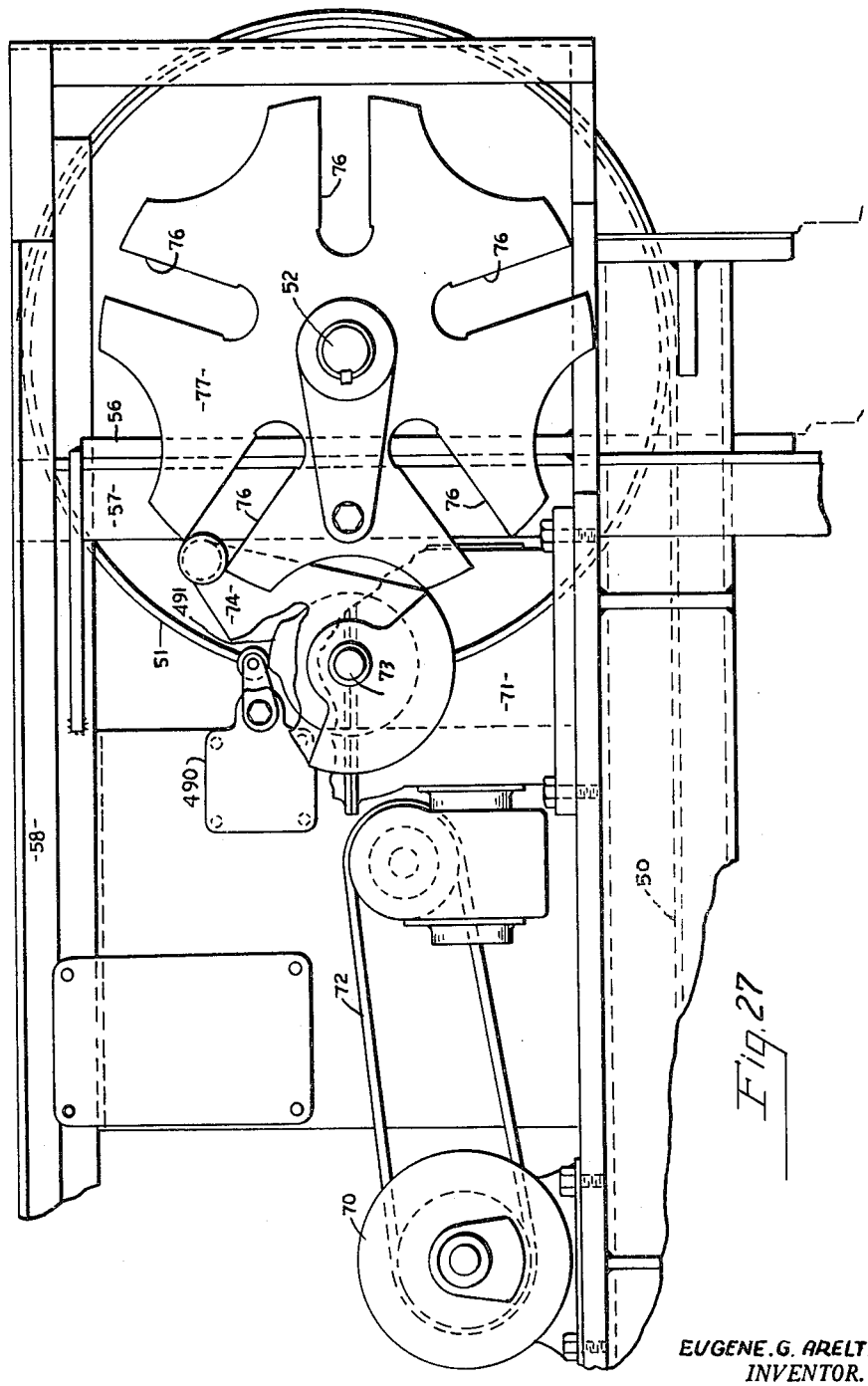

United States Patent Office 2,755,531
Patented July 24, 1956

2,755,531

APPARATUS FOR FETTLING ARTICLES OF GREEN POTTERY WARE

Eugene G. Arelt, Baldwinsville, N. Y., assignor to Onondaga Pottery Company, Syracuse, N. Y., a corporation of New York Original application June 20, 1950, Serial No. 139,755. Divided and this application June 26, 1951, Serial No. 233,608

14 Claims. (Cl. 25—22)

This invention relates to apparatus for automatically trimming or fettling green, air dried, unfired, pottery ware in preparing the same for firing. This application is a division of my copending application, Sr. No. 139,755, filed January 20, 1950, now Patent 2,608,738.

It is customary, in the manufacture of high grade tableware to trim, or fettle, the edge or rim of the ware by rotating the ware, either single pieces, or a plurality of pieces, arranged in a stack and while rotating the ware, applying a tool by hand against the edge of the ware to remove any fringe or flashing therefrom, and to form or round the edge of the ware to the desired semi-circular shape for better appearance and serviceability.

Attempts have been heretofore made to do the fettling operation mechanically. However, such attempts were not successful due mainly to the fact that the apparatus employed was incapable of performing on the extremely fragile, air dried ware which, at that stage, has very low tensile strength.

This invention has as an object apparatus which functions to automatically fettle the green ware without damaging or breaking the ware, and the apparatus embodies a structural arrangement by which a multiplicity of pieces of ware are fettled simultaneously, whereby the production of the apparatus is high.

The invention consists in the novel features and in the combinations and constructions hereinafter set forth and claimed.

In describing this invention, reference is had to the accompanying drawings in which like characters designate corresponding parts in all the views.

Figure 1 is a top plan view of a major portion of a machine embodying my invention.

Figure 2 is a top plan view of the portion of the machine immediately to the right of that shown in Figure 1.

Figure 3 is a side elevational view of the left hand portion of the machine shown in Figure 1 looking upwardly and with the discharge conveyor omitted, as indicated by the line 3—4, 3—4.

Figure 7 is a top plan view of the machine cabinet taken on a line corresponding to line 7—7, Figure 3, and with parts broken away.

Figure 8 is a side elevational view of the cabinet portion of the machine, as shown in Figures 3 and 4, with one of the side plates thereof removed and one partially broken away.

Figure 9 is a view taken on line 9—9, Figure 7.

Figure 10 is a view taken on line 10—10, Figure 7.

Figure 11 is a side elevational view, partly in section, of one of the ware grippers.

Figure 12 is an elevational view of the timer cam shaft and driving mechanism for controlling the sequence of operation of the machine.

Figure 13 is a fragmentary view taken on line 13—13, Figure 12.

Figure 14 is an elevational view of a fettling tool and the supporting arm therefor.

Figure 15 is an end elevational view looking to the right, Figure 14.

Figure 16 is a fragmentary sectional view taken on line 16—16, Figure 15.

Figure 17 is a side elevational view of a modified form of fettling tool.

Figure 18 is a top plan view of the tool arrangement shown in Figure 17.

Figure 19 is a view taken on line 19—19, Figure 17.

Figure 20 is an end elevational view of the tool shown in Figures 17 and 18.

Figure 21 is a view taken on line 21—21, Figure 20.

Figure 22 is a top plan view of a further modified form of fettling tool.

Figure 23 is a side elevational view of the tool shown in Figure 22.

Figure 24 is a plan view of the driving or actuating mechanism for the discharge conveyor.

Figure 25 is a side elevational view of the drive mechanism shown in Figure 24.

Figure 26 is a plan view of the actuating or driving mechanism for the in-feed conveyor.

Figure 27 is a side elevational view of the driving mechanism shown in Figure 26.

Figure 4:
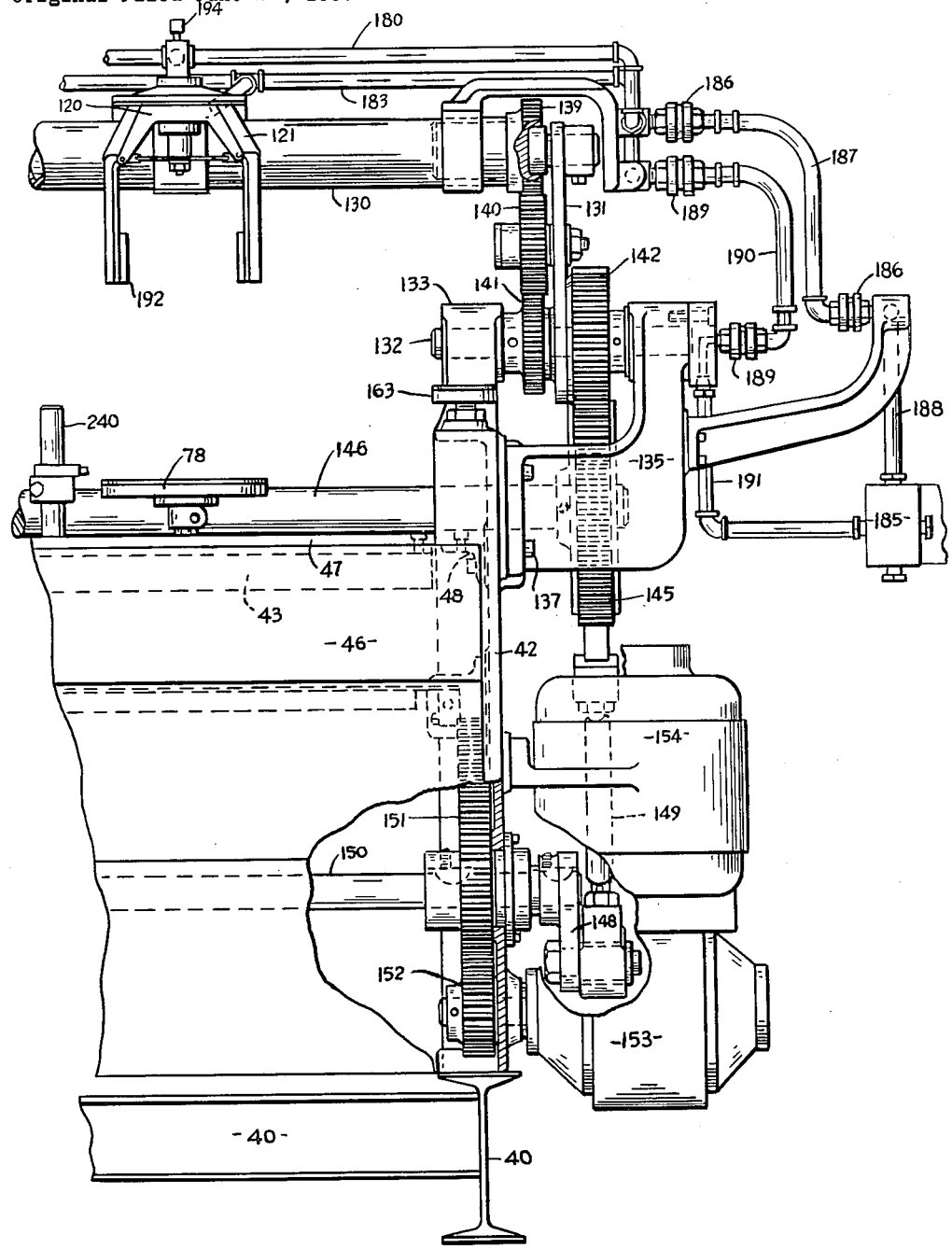
Figure 4 is a view, similar to Figure 3, of the right hand portion of the structure shown in Figure 1.

The machine consists generally of an in-feed conveyor, a discharge conveyor, and a plurality of vertically journalled ware rotating spindles arranged intermediate the conveyors.

The machine further includes ware transfer mechanism which operates to simultaneously transfer a plurality of pieces of ware from the in-feed conveyor to the fettling spindles and at the conclusion of the fettling operation to transfer the fettled ware to the discharge conveyor.

The machine proper includes a frame structure mounted upon a base structure formed of I beams 40. The ends of the framework consist of plates 41, 42, extending upwardly from the base and connected by lengthwise extending members 43, plates 44, 45, 46, and a top plate 47. The top plate 47 is secured to the upright plates 41, 42 by angle members 48, and the top plate and side plate 46 are secured together by the angle members 43.

An in-feed conveyor is mounted on one side of the cabinet. This conveyor is in the form of a wide belt 50 extending the major portion of the length of the cabinet and being trained over a driving roll 51, Figures 5 and 26, affixed to a shaft 52 as by set screws 53 positioned in the hubs of the webs of the roll. The shaft 52 is journalled at each end in a bearing 54, one of which is shown in Figure 26. The bearing 54 is mounted upon a plate 56 secured to an upright 57 forming part of the conveyor frame. The opposite end of the shaft is journalled in a similar structure, not shown, and the frame includes a horizontal member 58 extending along each side of the conveyor, these members being supported at their outer ends on uprights 59, Figures 28 and 29.

Figure 28:
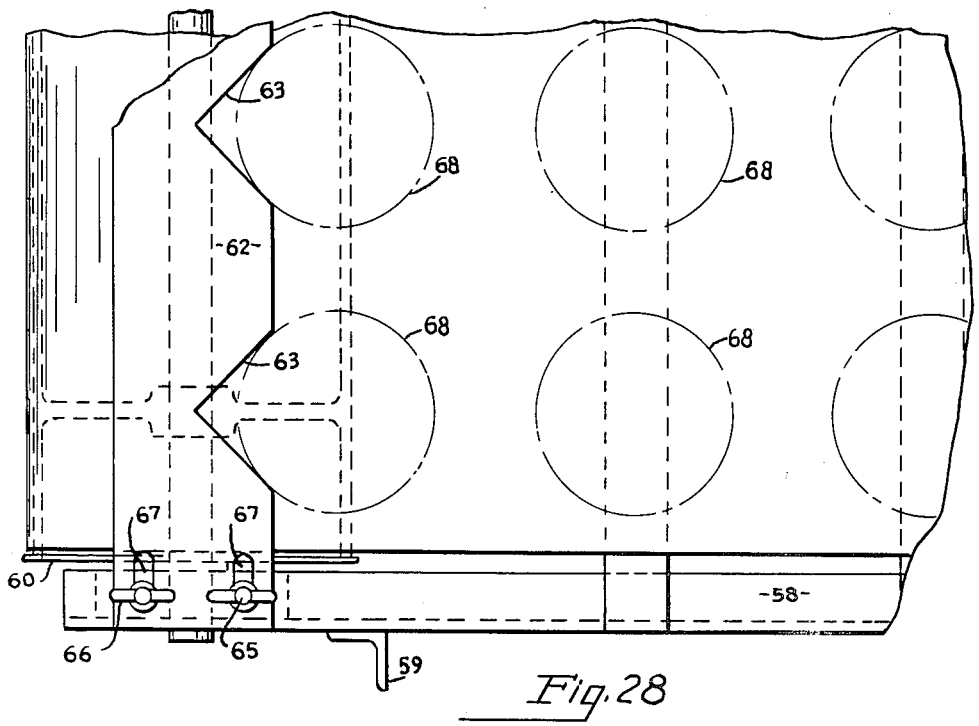
Figure 28 is a top plan view of the opposite end of the conveyor structure shown in Figure 26.
Figure 29:
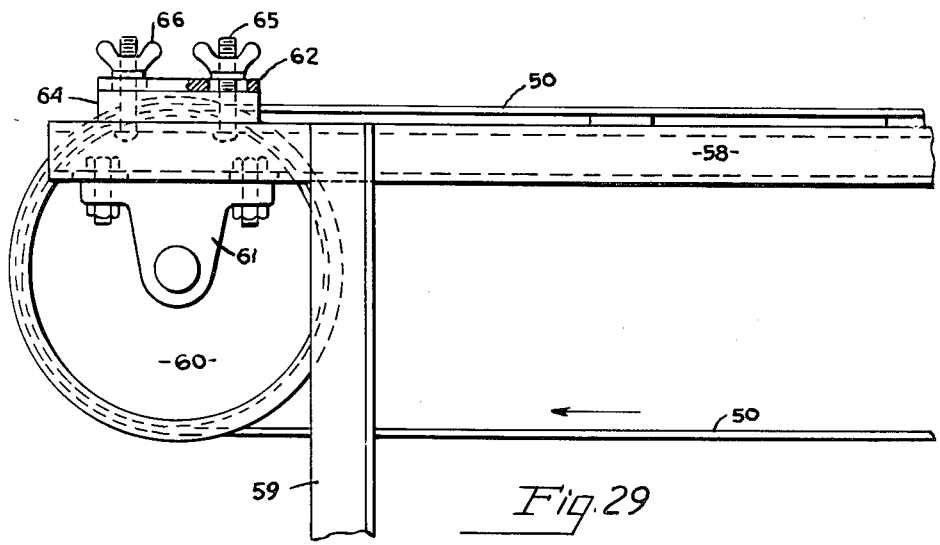
Figure 29 is a side elevational view of the structure shown in Figure 28.

The conveyor belt 50 is also trained over a roll 60 journalled in bearings 61 secured to the outer ends of the members 58, see Figures 28 and 29. A positioning guide or jig is arranged at the outer end of the conveyor and consists of a plate 62 extending transversely across the belt 50 and being formed with notches 63. The plate 62 is mounted on blocks 64 secured to the side rail members 58 as by bolts 65 and wing nuts 66. The plate 62 is formed with elongated apertures 67 to provide adjustment of the plate transversely of the belt. The pieces of ware, indicated in dotted outline at 68, Figure 28, are intially positioned on the belt in the V notches 63 to aline the pieces in a row in a predetermined position on the belt. As the upper run of the belt is advanced toward the cabinet of the machine, this row of ware will arrive at the cabinet in position to be engaged by the ware transfer mechanism.

The upper run of the conveyor belt 50, with the rows of ware thereon, is intermittently advanced towards the cabinet by a motor 70 connected to a gear reducing unit 71 by means of a belt 72, see Figures 26, 27. The output shaft 73 of the reduction unit has affixed thereto a Geneva crank 74, the roller 75 of which engages slots 76 of a Geneva disk 77 mounted upon the shaft 52. This in-put conveyor accordingly functions to intermitently advance rows of ware toward, and in juxtaposition to, the cabinet containing the ware transfer and trimming mechanism. As shown in the drawings, the arrangement is constructed to handle a row of six pieces of ware and there are accordingly six transfer members for transferring the six pieces of ware in each row to the pads or turn tables 78, Figure 10, by which the pieces of ware are rotated for the fettling operation.

The turn tables 78 are positioned on hub members 79 adjustably fixed to spindles 80 as by means of clamping screws 81, see Figure 10. The turn table plates 78 are clamped against the flange of the hub 79 by a hollow screw 82 threading into the end of the spindle and rotation of the hub is transmitted to the turn table by a dowel pin 83.

The spindles 80 are journalled vertically in bearings 85, 86, mounted in box shaped supports 67 secured to the under side of the top plate 47 of the machine cabinet. One of the spindles 80 has affixed to it a sprocket 88— for example, the third spindle from the left, Figures 7 and 8, and this sprocket is connected to a sprocket 89 by a chain 90. The sprocket 89 is fixed to the upper end of a shaft 91 journalled vertically in the cabinet and which carries at its lower end a pulley 92 connected to a driving motor 93 by a belt 94. This turn table spindle 80, together with the one positioned on the left thereof, Figure 8, and the two positioned on the right thereof, carry double sprockets 95. The two spindles on the ends of the machine, Figure 8, are provided with single sprockets. The spindles are operatively connected together by driving chains 98. It will be apparent that this arrangement provides for rotation of all the spindles at a uniform speed by the driving motor 93.

All of the spindles are formed with an axially extending passage 99, Figure 10. A member 100 is secured to the bottom wall of each of the supporting housings 67 as by screws 101. These members are formed with an axially extending passage 102 communicating with the passage 99 extending through the spindle. A depending cylindrical sleeve 103 is secured to each of the members 100 and is provided with a bottom closure 104 detachably secured thereto as by tension springs 105. A pipe 106 forms an extension of the passage 102 and terminates in proximity to the closure 104. The sleeve is filled with dust collecting material 107, such as oiled wool. The member 100 is formed with a passage 108 communicating with a pipe 109 which is connected to a header 110 through a valve 111 operated by a solenoid 112 and a pipe 113. The header 110 is connected to a vacuum pump through a main solenoid operated valve 114, Figure 8. The valve 114 and the individual valves 111 are opened to apply vacuum through the spindles 80 to fixedly secure the pieces of ware 68 to the turn table so that the pieces of ware will be rotated for the trimming or fettling operation.

A disk 115, Figure 10, of resilient material, such as rubber, is secured to the upper surface of each of the turn tables 78 and is preferably formed with a plurality of concentric grooves 116 to aid in fixedly securing the pieces of ware to the turn table by the vacuum means.

The pieces of ware 68, here shown in the form of flatware, such as dinner plates, are transferred from the in-feed conveyor belt 50 to the turn tables 78 by apparatus disclosed in Figures 3, 4, 5, 6 and 11. This apparatus consists of a pair of ware gripping members for each piece of ware. The gripping members consist of a circular member 120, Figure 11, having four depending arms 121, each of which is bifurcated at its lower end to receive a ware gripping finger having a depending arm 123 and an inwardly extending arm 124. These fingers are pivotally mounted on the arms 121 as by pivot pins 125. Each of the members 120 is formed with a radially extending bracket 126 which are secured to the ends of supporting members 128, as by screws 129. These members 128 are fixed intermediate their ends to a tubular shaft 130, Figure 4, which extends lengthwise of the machine and is journalled at its ends in brackets 131 which, in turn, are journalled at their lower ends on shafts 132. The shafts 132 are journalled at their inner ends in bearings 133 and at their outer ends in brackets 134, 135. The bearings 133 are mounted on the upper ends of the end plates 41, 42, of the cabinet frame. The bracket 134 is attached to the end plate 41 as by screws 136, and the bracket 135 is attached to the end plate 42, as by screws 137. A spur gear 139 is fixed to each end of the tubular shaft 130. These gears 139 are arranged in mesh with idler gears 140 journalled on the brackets 131 and meshing with gears 141 pinned to the shafts 132. Gears 142 are also pinned to the shafts 132 and are fixed to the brackets 131 as by screws 143, Figures 3 and 4.

Figure 5:
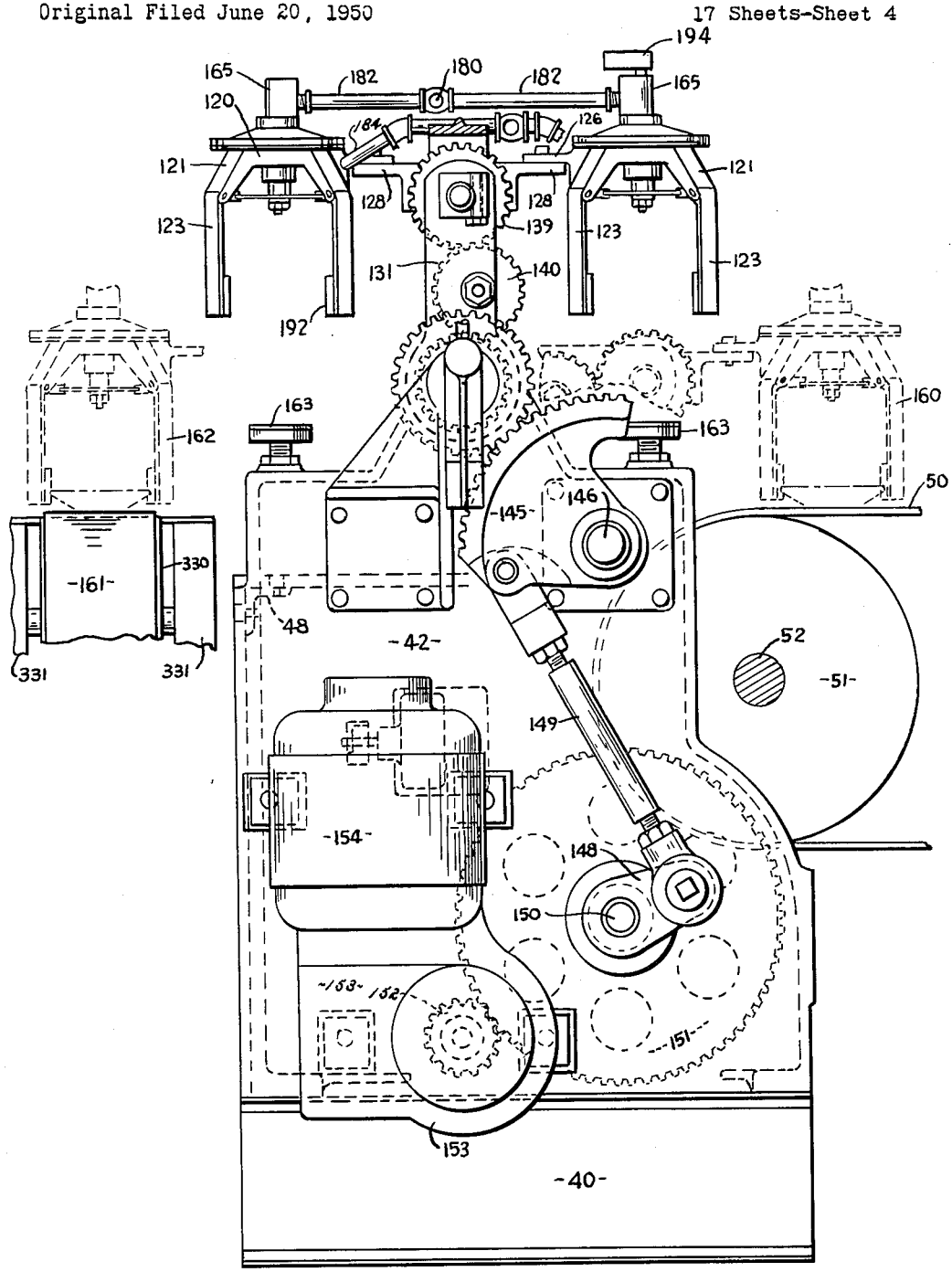
Figure 5 is an end elevational view of the structure shown in Figure 1, looking to the left of that figure.

The shafts 132 are oscillated by a gear quadrant 145, Figures 4 and 5, fixed to a shaft 146 which also extends lengthwise of the cabinet and is journalled at its ends in the end plates 41, 42. The gear quadrant 145 is connected to a crank 148 by a link 149. The crank 148 is fixedly secured to a shaft 150, Figure 4, which also extends lengthwise of the machine and is journalled in the end plates 41, 42. This shaft has affixed to it a spur gear 151 arranged in mesh with a pinion 152 on the output shaft of a gear reducer 153 driven by a motor 154, see Figure 4. With this arrangement, the shaft 146 is oscillated whereby the gear 142 is oscillated through the quadrant 145. The shaft 146 is also provided with a quadrant 156 at its opposite end to mesh with the gear 142 fixed to the bracket 131.

As the gears 142 are oscillated, the brackets 131 are also oscillated through an arc of approximately 180°. However during this oscillation of the brackets, the supporting members 128 are maintained in horizontal position through the action of the gears 139, 140 and 141, at each end of the assembly. The result is that when the transfer mechanism is moved to the right, Figure 5, one set of ware grippers is arranged in juxtaposition to the in-feed belt 50, and the other set is arranged in alinement with the turn table 78, as indicated at dotted outline 160. When the transfer mechanism is oscillated to the left, Figure 5, the ware gripping members that were previously arranged in alinement with the turn tables are shifted into juxtaposition to the out-feed conveyor belt 161, as indicated in dotted outline 162, and the ware gripping members that were formerly in juxtaposition to the in-feed conveyor belt 50 are moved in registration with the turn tables 78.

Adjustable stop members 163 are threaded into the top of the end plates 41, 42, and serve as stops for, and which are engageable by, the transfer mechanism. These adjustable stops 163 determine the lowermost position of the transfer so that the gripping fingers 123 are accurately positioned relative to the pieces of ware on the conveyors 50—161, and on the turn tables 78.

The detail structure of the ware gripping members is disclosed in Figure 11. The members 120 are formed with a central concavity over which is arranged a dished member 164 having a hub portion 165 formed with a central aperture 166 provided with a bushing 167 in which is slidably mounted a stem 168. The chamber formed between the members 120, 164, is partitioned by a flexible diaphragm 170, the peripheral margin of which is clamped between the members as by screws 171. The stem 168 is fixed centrally in the diaphragm by washers 172 and nut 173 threaded on the stem and acting against a shoulder formed by the lower enlarged portion 174 of the stem which is slidably mounted in a depending hub 175. The lower end of the stem has affixed to it a disk 176 and the inner ends of the arms 124 of the ware gripping fingers are provided with spaced flat spring members 177 between which the peripheral margin of the disk 176 is positioned.

The hub 165 is formed with a vertical passage 178 which communicates with a transversely extending passage 179 opening at one end into the bore 166 and being connected at its opposite end to a supply pipe 180, Figure 5, through a conduit 182. That portion of the chamber below the diaphragm 170 is connected to a supply pipe 183, Figure 4, through conduits 184. The supply pipes 180, 183, extend parallel above the shaft 130, the supply pipe 180 being connected to a valve 185 through rotary couplings 186, flexible conduits 187, 188. The supply pipe 183 is likewise connected to the valve 185 through couplings 189 and flexible pipes 190, 191.

The purpose of this arrangement is to apply pressure on either the upper or lower sides of the diaphragm 170. When pressure is applied on the upper side of the diaphragm through the supply pipe 180, the stem 168 and disk 176 is moved downwardly causing the arm 123 to move outwardly.

When pressure is applied through the pipe 183 to the under side of the diaphragm, the stem is moved upwardly and the fingers 123 moved inwardly. The lower ends of the fingers are provided with blocks 192 of soft resilient material, such as sponge rubber, so that when the fingers 123 are moved inwardly, the piece of ware 68 is gripped by the rim and as the mechanism is moved about the axis of the shafts 132, the ware is transferred from the in-feed conveyor belt 50 to the turn-tables 78 and from the turn-tables to the out-feed conveyor 161.

The solenoid operated valve 185 is controlled so as to supply fluid pressure to the top of the diaphragm as the transfer grippers are descending toward a piece of ware, or ready to move upwardly therefrom. As the grippers move over a piece of ware on the conveyor belt 50, or the turn-table 78, pressure is applied to the under side of the diaphragm, moving the fingers into engagement with the rim of the ware, and this pressure is maintained until the piece of ware has been transferred from the belt 50 to one of the turn-tables, or from one of the turn-tables to the belt 161, whereupon the pressure is exhausted and pressure applied to the upward side of the diaphragm to move the fingers out of engagement with the piece of ware.

When a piece of ware has been transferred from the belt 50 to a turn-table 78, the main vacuum valve 114, Figure 8, is opened and the valve 111 is opened to apply vacuum through the turn-table spindle 80 to hold the piece of ware on the turn-table. The motor 93 is energized, effecting rotation of the spindles and the fettling tool is moved radially inwardly to engage and trim the rim of the ware.

In the event a piece of ware is not moved to a turn-table 78, means is provided for not energizing the solenoid 112 of the valve 111 associated with that turn-table. In part, this means comprises a switch 194, Figure 11, fixed to the hub 165 of each of the transfer members and having an actuating stem 195 positioned in the upper end of the passage 66. The switch 194 is adjusted by the nut 196 so that the stem 195 will not be engaged by the stem 168 if the fingers 123 engage a piece of ware. However, if they do not engage a piece of ware or if after engaging the piece it should break, the stem 168 will move upwardly and engage the switch stem 195, opening the contacts of switch 194 which form part of the operating circuit for the individual solenoids 112, as will be hereinafter described. Accordingly, the absence of a piece of ware from one of the turn-tables 78 during the fettling operation will not break the vacuum applied to the other turn-tables.

The edge of the pieces of ware is fettled by tools movable into engagement with the edge of the piece of ware while it is being rotated on the turn-table 78. A shaft 240, Figure 10, is arranged in juxtaposition to each of the spindles 80. These shafts 240 are journalled parallel to the spindles 80 in bearings 241 mounted in a bearing support 242 depending from the top cabinet plate 47. Each shaft has fixed to its lower end a hub 243 having arms 244, 245, Figure 8, extending radially in opposite directions from the axis of the shaft 240. A tension spring 246 is attached to the arm 244 and its opposite end to a rod 247 extending through the cabinet side plate 46. The outer portion of the rods are threaded to receive a nut 248 to adjust the tension of the springs 246. The springs tend to urge the shafts 240 in a counter-clockwise direction, Figure 7. The arms 245 are formed with a depending portion 250, Figure 10, which is engaged by a bar 251 arranged in the cabinet and extending lengthwise of the machine. The ends of the bar 251 are attached to pistons mounted in cylinders 252 secured to the inner surface of the end plates 41, 42, see Figures 8 and 10.

The shafts 240 extend upwardly through the top plate 47. A hub member 255, Figure 14, is adjustably secured to the upper end of each spindle 240. The hub members 255 are formed with radially extending projections 256 to which a stem 257 is secured. In Figures 7, 14 and 15, the stems 257 are secured at one end to a flat spring 258 as by screws 259, and the springs are attached to the radial projections 256, as by screws 260.

A tool holder 261 is apertured to receive the stem 257 and is provided with a clamping screw having a nut 262 to permit adjustment of the tool holder axially and rotatably on the stem 257. The tool holder is formed with a slot in which fettling tools 263, 264, are mounted. The tools are spaced apart by a spacer 265 and are clamped in the tool holder as by screws 266. The ends of the tools facing toward the turn-table 78 are formed with concavities 267, Figure 15, or otherwise formed complemental to the edge finish desired for the ware. The ware is rotated as indicated by the arrow 268.

After the pieces of ware have been transferred to the turn-table 78, Figure 7, and are put in rotation thereby, fluid under pressure is supplied to the cylinders 252 to cause the pistons and the bar 251 carried thereby to move inwardly and thus permitting the spindles 240 to be rotated by the springs 246, moving the fettling tool into engagement with the edge of the ware. The tool or bit 263 first removes any excessive flash or fin from the bead on the edge of the ware. The tool is yieldingly urged inwardly toward the axis of the ware by the tension springs 246. During this movement, the leading edge of the tool or tool bit 264 engages and trims or fettles the bead of the ware to a smooth uniform surface. The leading ledge of the tool 264 is positioned on the radius of the ware, as indicated by the dotted line R, Figure 21. The tool 263 is spaced forwardly of this point and accordingly the trailing edge of this tool, while in line with the leading edge 264, is spaced a very slight distance outwardly from the surface of the ware. This arrangement of the tools 263, 264, is particularly advantageous in that the tool 263, because of its position, rides on the rim of the piece of ware without effecting a cutting or shaving action, and thereby serves to steady the trimming tool as a whole and prevents the tool 264 from "hogging" into the bead or rim of the ware. In this connection, it is to be kept in mind that the piece of ware is only air dried and has not been fired and accordingly is extremely fragile, and further the object of this automatic fettling or trimming is to produce a smooth uniform surface on the bead of the ware without any chatter marks, or other defects.

It will be observed, referring to Figures 16 and 21, that rotation of the piece of ware 68 in the direction of the arrow 268, the edge of the ware is finally presented to the leading edge of the tool 264 which is capable of effecting a shaving or cutting action on the bead of the ware. However, the trailing edge of the tool 263 engages the bead and simply rides on the bead without any shaving effect by automatically forming a stop for the fettling tool. In other words, the tools 263, 264, are positioned on opposite sides of the radius extending from the axis of the turn-table spindles 80.

The function of the springs 258 is to permit a slight vertical movement of the fettling tool during the rotation of the ware in the event there should be a slight warp in a piece of ware. It will be apparent that the hub members 255 may be adjusted vertically to the desired height and are clamped in adjusted position by screws 270. Also, the tool holder 261 may be adjusted radially and also rotatably on the stems 257.

A modified form of tool mounting is disclosed in Figures 17 to 21. In this case, the hub member 255 is formed with a circular face 271 on which there is mounted, for adjustment about an axis perpendicular to the spindle 240, a plate 272. The plate is formed with arcuate slots 273 to receive clamping screws 274. The spring 258 is attached to the plate 272 as by screws 275, and the spring is attached to an arm 276 as by screws 277. The arm 276 is formed of flat stock and tapers in thickness and at its outer end is formed with an elongated slot 278. The tool holder block 279 is secured to the stem by a screw 280 extending through the slot 278. In this case, the fettling tools 263, 264, are fixedly secured to the block 279.

The hub member 255 may be formed with a radial boss 281 threaded to receive an adjusting screw 282, the lower end of this screw abutting against a collar 283 mounted on the spindle 240 and secured in adjusted position by a set screw 284, Figure 19. This permits, for convenience, fine adjustment of the hubs 255 when the clamping screws 270 are loosened.

For some types of ware, the tool shown in Figures 22 and 23 is advantageous. The stem 276 is formed of flat stock secured to the plate 272 as by screw 286, and is formed at its outer end with a slot 278 to receive a clamping screw 287 which functions to clamp a U shaped frame having legs 288 to the stem. U shaped brackets 290 are mounted on the outer sides of the legs 288 and clamping members 291 are arranged in the brackets 290 being pivotally mounted thereto. Compression springs 293 urge the lower ends of the clamp members 291 outwardly and their upper ends inwardly to clamp the end of an abrasive band 294 against the ends of the legs 288. The band 294 is arranged to have considerable slack and the frame is adjusted on the stem so that one of the legs 288 is positioned below the plane of the turn-table 78 and the other leg above the table, whereby the abrasive band 294 is drawn or wrapped around the bead of the piece of ware and thereby conforms readily to the arcuate form of the bead of the ware.

When the pieces of ware 68 have been fettled, they are automatically transferred to the discharge conveyor 161, see Figure 1, as previously described. This conveyor consists of an endless belt trained over a drum 330 journalled between uprights 331 mounted on one of the base members 40 in juxtaposition to the end plate 41 of the machine cabinet. The belt is also trained over a driving drum 332, Figure 25, mounted on a shaft 333 journalled in bearings 334 mounted on uprights 335. The uprights 331 and 335 are connected at their upper ends by rails 336 extending on opposite sides of the upper run of the belt 161. A plate 337 is mounted upon the side rails 336 and forms a support for the upper run of the belt 161. This plate is omitted in Figures 1, 2 and 24, in order to better show the structure positioned below the plate.

This conveyor is advanced during the fettling operation. In the structure previously described, six pieces of ware are advanced simultaneously by the in-feed conveyor 50, and these six pieces of ware are simultaneously fettled on the six turn-tables 78, and the six pieces of fettled ware are simultaneously transferred from the turntables to the conveyor belt 161. During the fettling of the six pieces of ware, the belt 161 is advanced to advance the six pieces of ware thereon from the cabinet or machine in which the fettling mechanism is mounted. In my copending application, Ser. No. 139,755, now Patent No. 2,608,738, mechanism for dusting and cobbing the six pieces of fettled ware is arranged in juxtaposition to the belt 161, such mechanism being illustrated in Figure 2 and bearing the legend "D & C." Insofar as this application is concerned, the function of the outgoing conveyor 161 is to effectively advance the fettled ware from the fettling apparatus. However, the drive for the conveyor 161, illustrated in Figures 24, 25, functions to advance the conveyor 161 a sufficient distance to present an empty section of the conveyor belt in juxtaposition to the fettling apparatus, and this advancement is intermittent or in a succession of steps, the drive illustrated functioning to advance the conveyor in seven successive steps performed during the fettling operation. The reason for advancing the conveyor seven steps instead of six, which would be sufficient to effectively advance the six pieces of fettled ware, is to provide for the positioning of a setter on the belt 161, as at 338, Figure 1, whereby the dusting and cobbing mechanism may dust and cob the setter as well as the six pieces of ware, and as the setter and dusted and cobbed pieces of ware approach the pulley 332, the pieces of ware are placed in a stack on the setter. However, as previously stated, the advancement of the belt 161 could be continuous during the fettling operation insofar as this invention is concerned.

The conveyor is advanced by a motor 340, Figure 24, connected to a gear reducing unit 341 by a belt 342. The output shaft 343 of the reducing unit is provided with a crank 344 connected to a crank 345 on the shaft 333 by a connecting rod 346. The crank 345 is connected to the shaft 333 through a ratchet and pawl mechanism, or overrunning clutch 347. The motor 340 is initially energized by a switch controlled by the main control cam shaft. The circuit to the motor is opened by a switch 349. This switch is operated by a pin 350 carried on a gear 351 arranged in mesh with a pinion 352 which is fixedly secured to a gear 353 arranged in mesh with a pinion 354 mounted on the output shaft 343 of the gear reducing unit 341. The gears 351, 352, 353, are journalled on studs carried by a bracket 355. The motor and conveyor actuating mechanism is mounted upon a supporting plate 356, Figure 25, supported at one end by braces 357 secured to the uprights 335 and at its opposite end by bars 358 depending from the side rails 336. The gear train 351, 352, 353, 354, provides a ratio whereby the pin 350 opens the switch 349 when the shaft 343 has made seven revolutions, or the conveyor has been advanced seven steps. The lower run of the belt 161 is guided over an idler pulley 360 journalled between brackets 361 depending from the side rails 336.

Figure 6:
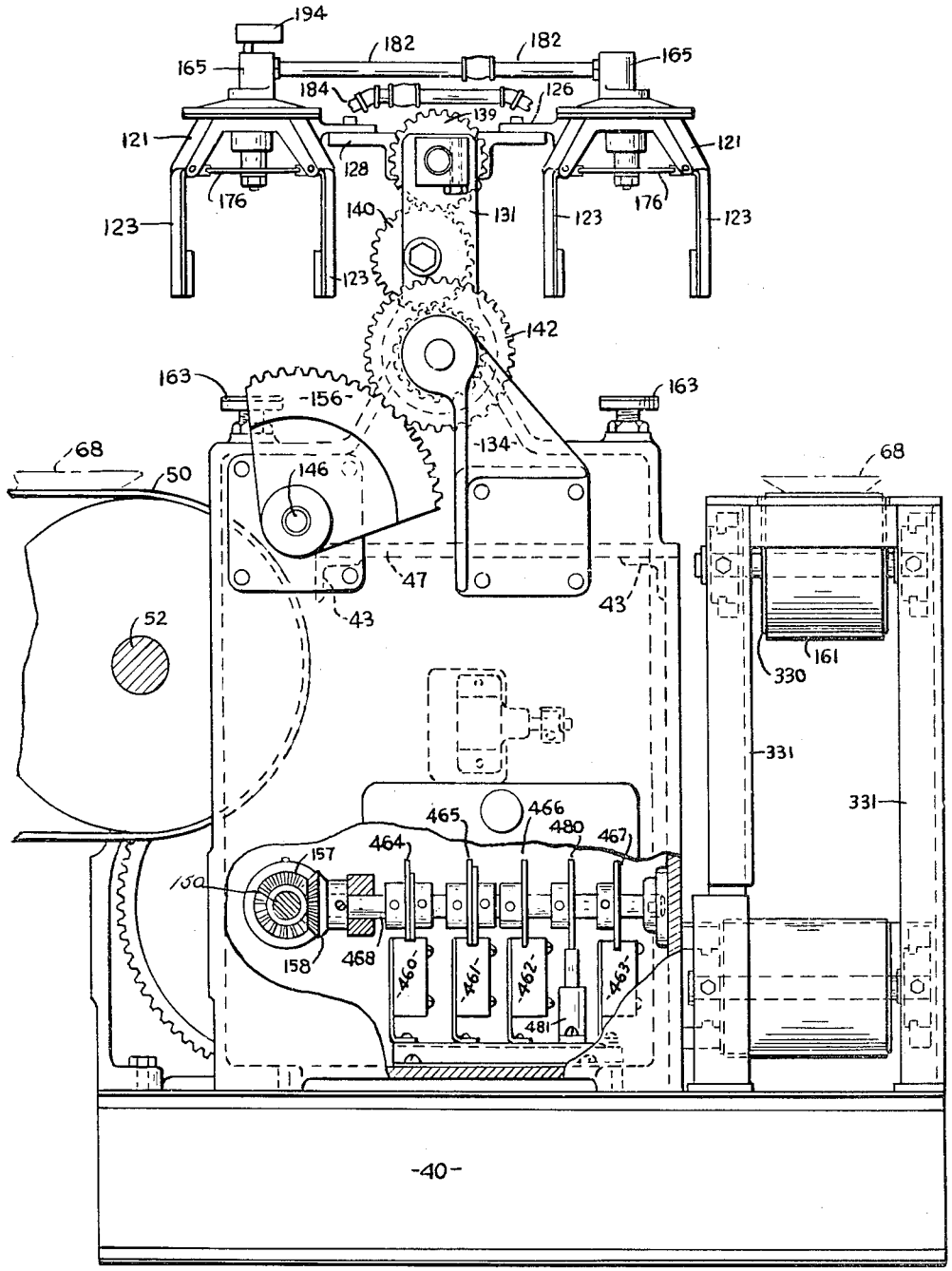
Figure 6 is an end elevational view looking to the right, Figure 1, with parts broken away.

The various operations performed by the machine are controlled by a series of switches 450, 451, 452, 453, Figure 12, which are actuated by cams 454, 455, 456 and 457 respectively, mounted on a shaft 458, and by a second group of switches 460, 461, 462, 463, Figure 6, operated by cams 464, 465, 466 and 467, respectively. These latter cams are mounted on a cam shaft 468 driven from the shaft 150 through beveled gears 157, 158, Figure 6.

The cam shaft 458 controlling the switches 450–453 is journalled in bearings 469, 470, mounted outside the frame structure of the machine, see Figure 12. This shaft 458 may be driven by a motor 471 through a gear reduction 472 and a chain 473 or, it may be driven from a shaft 474 extending from the jigger or ware forming machine through an over-running clutch or ratchet mechanism. As shown in Figures 12 and 13, a sprocket 475 is rotatably journalled upon the shaft 474 and carries a pawl 476 urged into a notch formed in a driving collar 477 secured to the shaft, as by set screws 478, the sprocket 475 being operatively connected to a sprocket affixed to the cam shaft by means of a chain 479. In either event, the shaft 458 is rotated one revolution for the production of six pieces of ware by the ware forming machine, or one revolution for the formation of the number of pieces of ware arranged on each row on the in-feed conveyor belt 50.

Assuming that a row of ware has been advanced by the belt 50 into juxtaposition with the cabinet portion of the machine, cam 457 actuates switch 453 completing an energizing circuit for the transfer motor 154. This motor actuates the transfer mechanism to move the ware transfer members 121 on the side of the machine toward the in-feed conveyor 50 into registration with the pieces of ware on the conveyor. As the lower ends of the fingers 123 are positioned about the pieces of ware, a cam 480 actuates an air valve 481, Figure 6, which, in turn, operates the four-way valve 185 to admit air to the header 183 and through the conduits 184 to the under side of the diaphragm 170, causing the stem 174 to move upwardly and the fingers 123 to move inwardly and grasp the rim of the pieces of ware. The transfer members are then moved upwardly and laterally to position the pieces of ware on the turn-tables 78, at which time the cam 480 again actuates the valve 481 to effect operation of the valve 185 to exhaust the air from the under side of the diaphragms 170 and to apply air on the upper side thereof, causing the fingers 123 to move outwardly and release the pieces of ware. Simultaneously with this latter operation, cam 466 actuates switch 462 to energize the main vacuum valve 114, Figure 8, to supply vacuum to the header 110 and to the turn-table spindles 80 through the individual valves 111. However, as previously explained, if when a transfer member arrives in juxtaposition to a turn-table it does not have a piece of ware, the stem 168 has opened switch 194 and these switches are connected in series with the respective individual solenoids 112. With this arrangement, vacuum is supplied to each spindle on the turn-table on which there has been deposited a piece of ware.

Immediately upon the application of vacuum to the spindle, cam 456, Figure 12, actuates switch 452 to energize the spindle drive motor 93 for a predetermined period of time and during rotation of the spindles, cam 455 actuates switch 451 which, in turn, effects operation of a four-way solenoid operated air valve, not shown, and which functions to apply air pressure to the cylinders 252 to cause the pistons therein to move inwardly and to effect similar movement of the bar 251, Figure 7, which permits the trimming tools to move inwardly into engagement with the edge of the ware under the influence of the springs 246. At the duration of the trimming operation, the mechanism just described functions to apply air on the opposite sides of the pistons in the cylinders 252 to move the bar 251 outwardly and to move the trimming tools out of engagement with the ware, whereupon the cam 456 and switch 452 controlled thereby open the circuit to the spindle motor 93.

The cam 467 actuates switch 463 controlling the circuit to the main vacuum valve 114 to cause this valve to disconnect the source of vacuum to the header 110 and to connect the latter to atmosphere as soon as the spindle turn-tables 78 have stopped rotating.

Previous to the energization of motor 93, the transfer motor 154 continued its operation and moved the transfer members to the upper rest position disclosed in Figures 5 and 6. The motor 154 is stopped with the transfer members in this position with the actuation of switch 460 by cam 464. During rotation of the spindles 80, switch 450 is closed by cam 454, furnishing a circuit to motor 70, causing the conveyor 50 to advance one step by means of the Geneva drive described in connection with Figure 27. At the end of this movement, the motor circuit is opened by switch 490 actuated by a cam 491 associated with the Geneva crank 74, see Figure 27. This advancement of the conveyor 50 brings another row of ware into juxtaposition with the cabinet portion of the machine. Also during the trimming operation, the discharge or outgoing conveyor 161 has been actuated seven successive steps forwardly. The motor 340 for actuating this conveyor is initially energized by actuation of switch 461 by cam 465, and the motor runs continuously to effect seven revolutions of the shaft 343, as previously described, at which time the circuit to the motor is opened by the switch 349, Figure 24. The machine functions in repetition of the cycle just described, whereby the air dried ware is automatically placed upon the turn-table 78, the edge of the ware fettled, the fettled ware automatically transferred to the conveyor 161 and advanced from the machine by that conveyor.

What I claim is:

1. Mechanism for trimming articles of pottery ware comprising a frame, a spindle journalled in the frame and having means cooperable to detachably hold a piece of ware thereon for rotation by the spindle, a shaft journalled in the frame in spaced relation to said spindle and extending parallel thereto, a tool arm extending radially from the shaft, the outer end portion of said arm being yieldingly movable axially of said shaft and spindle, a trimming tool detachably mounted on the outer end of said arm, and means operable to move said shaft about its axis to move the tool into and out of engagement with the rim of a piece of ware rotated by said spindle.

2. Mechanism for trimming articles of pottery ware comprising a frame, a spindle journalled in the frame and adapted to effect rotation of a piece of ware mounted thereon, a shaft journalled in the frame in parallel spaced relation to said spindle, an arm extending radially from the shaft, a fettling tool mounted on the outer end of the arm and positioned to be moved into and out of engagement with the edge portion of a piece of ware on said spindle upon oscillation of said shaft, the outer portion of said arm being yieldingly movable axially of said spindle, and means operable to oscillate said shaft during rotation of the spindle.

3. Mechanism for trimming articles of pottery ware during rotation thereof comprising a shaft journalled in parallel spaced relation to the axis of the ware, an arm mounted at one end to said shaft, a trimming tool mounted on the opposite end of the arm, said arm being yieldable to permit movement of the tool axially of the piece of ware, and means yieldingly rotating said shaft to move said tool into engagement with the piece of ware.

4. Mechanism for trimming articles of pottery ware during rotation thereof comprising an arm, a U-shaped frame mounted on said arm with the open side of the frame extending toward the piece of ware and with said frame inclined relative to the axis of the piece of ware, a flexible abrasive band secured at its ends to the leg portions of said U frame with the intermediate portion of said band slack, and means operable to move said arm and frame toward the axis of the piece of ware, and to bring the intermediate portion of the band into trimming engagement with the peripheral edge of the ware.

5. Mechanism for trimming unfired articles of tableware during rotation thereof comprising a shaft journalled on an axis extending parallel to the axis of the rotating ware, an arm extending radially from said shaft, a fettling tool mounted on the outer end of said arm and being movable into and out of engagement with the edge of the piece of ware upon oscillation relative to said shaft, and means operable to adjust said arm axially of the shaft.

6. Mechanism for trimming unfired articles of tableware comprising a frame, a spindle journalled vertically in the frame and being formed with a passage extending axially therethrough, a hub member mounted on the upper end of said spindle and being adjustable lengthwise thereof, means for securing the hub member to the spindle in adjusted position, a ware supporting turn table positioned on said hub member, said turn table being formed with a central aperture in registration with said axially extending passage in the spindle, means operable to detachably clamp said turn table to said hub member, and means for supplying vacuum to the lower end of the spindle.

7. A machine for trimming articles of unfired pottery ware during rotation thereof comprising a frame, a plurality of spindles journalled vertically in the frame and arranged in a row, a fettling tool mounted in the frame in juxtaposition to each of said spindles, and said fettling tools being movable into and out of engagement with the edge portion of the pieces of ware rotated by said spindles, motion transmitting means operable to effect simultaneous rotation of said spindles, and means common to all of said tools and operable to simultaneously and yieldingly move the same toward the axes of the pieces of ware into engagement with the edge portions thereof.

8. A machine for finishing articles of unfired tableware during rotation thereof comprising a frame, a plurality of vertical spindles journalled in the frame and arranged in a row, a turn table secured to the upper end of each of said spindles for supporting a piece of ware, a shaft journalled vertically in the frame in juxtaposition to each of said spindles, a fettling tool detachably secured to the upper end of each of said shafts, said tools being movable into and out of engagement with the edge of pieces of ware positioned on said turn tables, motion transmitting means connected to said spindles and operable to effect simultaneous rotation of all of said spindles, and means common to all of said shafts and operable to effect rotation of said shafts to move said tools into engagement with the pieces of ware.

9. Mechanism for trimming articles of pottery ware comprising a frame, a spindle journalled in the frame and adapted to effect rotation of a piece of ware mounted thereon, a shaft journalled in the frame in parallel spaced relation to said spindle, an arm extending radially from the shaft, a trimming tool mounted on the outer end of the arm and positioned to be moved into and out of engagement with the edge portion of a piece of ware on said spindle upon oscillation of said shaft, said trimming tool comprising a holder, a pair of ware engaging members mounted on said holder and being spaced apart circumferentially relative to the piece of ware, one of said members being operable to trim the edge portion of the piece of ware, and the other member being operable upon engagement with the ware to limit radial inward movement of said first member.

10. Mechanism for trimming articles of pottery ware comprising a frame, a spindle journalled in the frame and adapted to effect rotation of a piece of ware mounted thereon, a shaft journalled in the frame in parallel spaced relation to said spindle, an arm extending radially from the shaft, a trimming tool mounted on the outer end of the arm and positioned to be moved into and out of engagement with the edge portion of a piece of ware on said spindle upon oscillation of said shaft, said trimming tool consisting of two pre-formed tool bits fixedly mounted on a common holder with one of said tool bits arranged to engage the peripheral edge of the ware and the other of said tool bits being spaced outwardly slightly from the edge of the ware and normally not engaging the same.

11. Mechanism for trimming articles of pottery ware comprising a frame, a spindle journalled in the frame and adapted to effect rotation of a piece of ware mounted thereon, a shaft journalled in the frame in parallel spaced relation to said spindle, an arm extending radially from the shaft, a trimming tool mounted on the outer end of the arm and positioned to be moved into and out of engagement with the edge portion of a piece of ware on said spindle upon oscillation of said shaft, said trimming tool consisting of a pair of tool bits fixedly mounted on a common holder and arranged in spaced apart relation circumferentially of the ware, one of said bits being arranged to remove material from the peripheral edge of the ware upon engagement therewith and the other bit being arranged to clear the edge of the ware while said first bit is in engagement therewith and said second bit being operable upon engagement with the ware to ride thereon without removing material therefrom.

12. Mechanism for trimming articles of pottery ware comprising a frame, a spindle journalled in the frame and adapted to effect rotation of a piece of ware mounted thereon, a U-shaped frame arranged with the open side of the frame confronting the edge of the rotating piece of ware, a flexible abrasive band having its end portions secured to the ends of the leg portions of the U frame with the intermediate portion of the band slack, and means operable to move said frame toward the piece of ware and to bring the intermediate portion of said band into engagement with the edge of the ware, and the end portions of the band being positioned respectively outwardly from the face and rear sides of the piece of ware and inwardly from the edge thereof.

13. Mechanism for trimming articles of pottery ware comprising a frame, a spindle journalled vertically in the frame and adapted to effect rotation of a piece of ware mounted thereon, a U-shaped frame member arranged with the open side of said member confronting the edge of the piece of ware, the ends of the leg portions of said frame being positioned in spaced apart vertical planes, a flexible abrasive band attached to said ends of the leg portions with the intermediate portion of the band slack, means for moving said frame towards the axis of the ware in a plane perpendicular to said axis to bring the intermediate slack portion of said band into engagement with the edge of the ware.

14. Mechanism for trimming flat articles of pottery ware comprising a frame, a spindle journalled in the frame and having means to effect rotation of a piece of ware, a U-shaped holder arranged with the open side of the holder extending toward the piece of ware and with said frame inclined relative to the axis of the piece of ware, a flexible abrasive band secured at its ends to the leg portions of said holder with the intermediate portion of said band slack, means operable to move said holder toward the axis of the piece of ware in a plane perpendicular to said axis and to bring the intermediate portion of the band into engagement with the peripheral edge of the ware.

References Cited in the file of this patent

UNITED STATES PATENTS

| Number | Name | Date |
|---|---|---|
| 101,981 | Sweet et al. | Apr. 19, 1870 |
| 278,177 | Pettit | May 22, 1883 |
| 1,641,815 | Kauffman | Sept. 6, 1927 |
| 2,078,484 | Dobson | Apr. 27, 1937 |
| 2,293,070 | Miller et al. | Aug. 18, 1942 |
| 2,376,800 | Miller | May 22, 1945 |
| 2,399,689 | Miller | May 7, 1946 |
| 2,587,271 | Allen et al. | Feb. 26, 1952 |
| 2,608,738 | Arelt | Sept. 2, 1952 |
| 2,619,701 | Jordan | Dec. 2, 1952 |